(12) United States Patent
Dhong et al.

(10) Patent No.: US 6,421,699 B1
(45) Date of Patent: Jul. 16, 2002

(54) METHOD AND SYSTEM FOR A SPEEDUP OF A BIT MULTIPLIER

(75) Inventors: Sang Hoo Dhong, Austin, TX (US); Perng Shyong Lin, Hsin-Chu (TW); Joel Abraham Silberman, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/272,489

(22) Filed: Mar. 19, 1999

(51) Int. Cl.$^7$ ................................. G06F 7/52
(52) U.S. Cl. ....................... 708/630; 708/625
(58) Field of Search ................. 708/625, 627–630

(56) References Cited

U.S. PATENT DOCUMENTS

| | | | | |
|---|---|---|---|---|
| 5,291,431 A | * | 3/1994 | Ho et al. | 708/630 |
| 5,818,743 A | * | 10/1998 | Lee et al. | 708/630 |
| 5,870,322 A | * | 2/1999 | Kim | 708/630 |
| 6,021,424 A | * | 2/2000 | Chu | 708/630 |
| 6,183,122 B1 | * | 2/2001 | De Angel | 708/628 |

* cited by examiner

Primary Examiner—Tan V. Mai
(74) Attorney, Agent, or Firm—Casimer K. Salys; Bracewell & Patterson, L.L.P.

(57) ABSTRACT

A method and system is provided which overlaps the process of partial product reduction and the final adder in both higher- and lower-order bits when performing multiplication. The method and system reduces the number of left-over bits such that the final addition on these bits requires fewer logic stages to complete its process thereby reducing the propagation delay.

20 Claims, 10 Drawing Sheets

| Fig. 3 |
|---|
| Fig. 3A |
| Fig. 3B |
| Fig. 3C |
| Fig. 3D |
| Fig. 3E |

Fig. 3C and Fig. 3D $$S = 3\left[\left(\frac{1}{2}\right)^{n_3} + \left(\frac{1}{2}\right)^{n_3+1} + \left(\frac{1}{2}\right)^{n_3+2} + \ldots + \left(\frac{1}{2}\right)^{n_3+n_2}\right]$$

$$< 3\left[\left(\frac{1}{2}\right)^{n_3} + \left(\frac{1}{2}\right)^{n_3+1} + \left(\frac{1}{2}\right)^{n_3+2} + \ldots + \left(\frac{1}{2}\right)^{n_3+n_2}\right]$$

$$= 3\left[\left(\frac{1}{2}\right)^{n_3} + \left(\frac{1}{2}\right)^{n_3+1} + \left(\frac{1}{2}\right)^{n_3+2} + \ldots + \left(\frac{1}{2}\right)^{n_3+n_2}\right]$$

$$= 3\left[1 - \left(\frac{1}{2}\right)^{n_3+n_2}\right]$$

Carry-in at bit position $x_2$

| | $C_{actural} = 0$ | $C_{actural} = 1$ | $C_{actural} = 2$ |
|---|---|---|---|
| $a_1 = 0$ and $b_1 = 0$ | 0 | 0 | 1 |
| $a_1 = 0$ and $b_1 = 1$ | 0 | 1 | 1 |
| $a_1 = 1$ and $b_1 = 0$ | 0 | 1 | 1 |
| $a_1 = 1$ and $b_1 = 1$ | 0 | 0 | 1 |

*Fig. 6*

No. of logic stages to get sum using binary Carry-Lookahead Adder
(no carry-in or carry-in has known to be either 1 or 0)

| No. of bits in each operand | # of stages to get sum | # of stages to get carry-out |
|---|---|---|
| 1 | 1 | 1 |
| 2 | 2 | 1 |
| 3-4 | 3 | 2 |
| 5-8 | 4 | 3 |
| 9-16 | 5 | 4 |
| 17-32 | 6 | 5 |
| 32-64 | 7 | 6 |
| 65-128 | 8 | 7 |

*Fig. 7*

METHOD AND SYSTEM FOR A SPEEDUP OF A BIT MULTIPLIER

BACKGROUND OF THE INVENTION

1. Technical Field

The present invention relates to a method and system for data processing or information handling systems in general and, in particular, to a method and system for a multiplier implementing multiplication in a computer system. Still more particularly, the present invention relates to a method and system for overlapping the process of partial product reduction when implementing multiplication in a computer system.

2. Description of the Prior Art

Applications of modern computer systems are requiring greater speed and data handling capabilities for uses such as multimedia and scientific modeling. Multimedia and scientific modeling require massive data manipulation and an extraordinary amount of high-performance arithmetic and vector-matrix operations. One such operation is the classical multiplier implementing multiplication between two bit registers. One such prior art hard-wired multiplication scheme for implementing multiplication is shown in FIG. 1. The hard-wired multiplication scheme is basically divided into two parts. The first part produces, using a multiplier 20, multiplicand 22 and a Booth encoder 24 a matrix of partial product rows 26. These partial product rows 26 are then reduced to two rows (sum and carry) 34 by some kind of counter or Wallace tree 32, shown in FIG. 1 using a 4/2 carry save adder (CSA) compressor 28 (and by way of example may use a 3/2 or 7/3 compressor). The second part reduces the two rows to one by using a big 2/1 adder 30, such as Carry Propagate Adder (CPA) or Carry-Select Adder (CSA) resulting in a final product 36. Prior art multipliers normally implement these two parts separately, and in many cases they are in separate pipeline stages. To reduce the propagation delay, one possible approach is to combine the two parts such that the final adder can start its calculation before the CSA tree finishes its tournament.

One such prior art solution for combining the two parts such that the final adder can start its calculation before the CSA tree finishes its tournament is shown in FIG. 2. As shown in FIG. 2, the addition of the lower 30 bits 38 utilizing a 16-bit carry select adder 42 are overlapped with the reduction of the partial product array 40. However, this 30-bit addition overlap does not provide a speed gain, since the left over 76 bits 44 will need the same number of logic stages 46 (8 stages) to complete the final addition as the original 106 bits do.

Therefore, there is a need for a method and system to overlap the final addition on the higher order bits as well as the lower order bits to reduce the propagation time effectively. Additionally, it would be desirable to reduce the number of left-over bits so that the final addition on these bits requires fewer logic stages to complete its process, and thus reduce the propagation delay. The subject invention herein solves these problems in a new and unique manner that has not been part of the art previously.

SUMMARY OF THE INVENTION

In view of the foregoing, it is therefore an object of the present invention to provide an improved method and system for performing multiplication utilizing a speedup multiplier in a computer system or information handling system.

It is another object of the present invention to provide an improved method and system when performing multiplication by overlapping the process of partial product reduction in a computer system or information handling system.

The foregoing objects are achieved as is now described. The method and system of the present invention overlaps the process of partial product reduction and the final adder in both higher- and lower-order bits when performing multiplication. The method and system reduces the number of left-over bits such that the final addition on these bits requires fewer logic stages to complete its process thereby reducing the propagation delay.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 5 is a mathematical equation illustrating the limits used for the upper bound carry in accordance with the present invention;

FIG. 6 is a Table showing the logic for a carry-in at a bit position;

FIG. 7 is a Table showing the number of logic stages to get a sum using a binary Carry-Look-Ahead Adder;

DETAILED DESCRIPTION OF A PREFERRED EMBODIMENT

Figure 1:
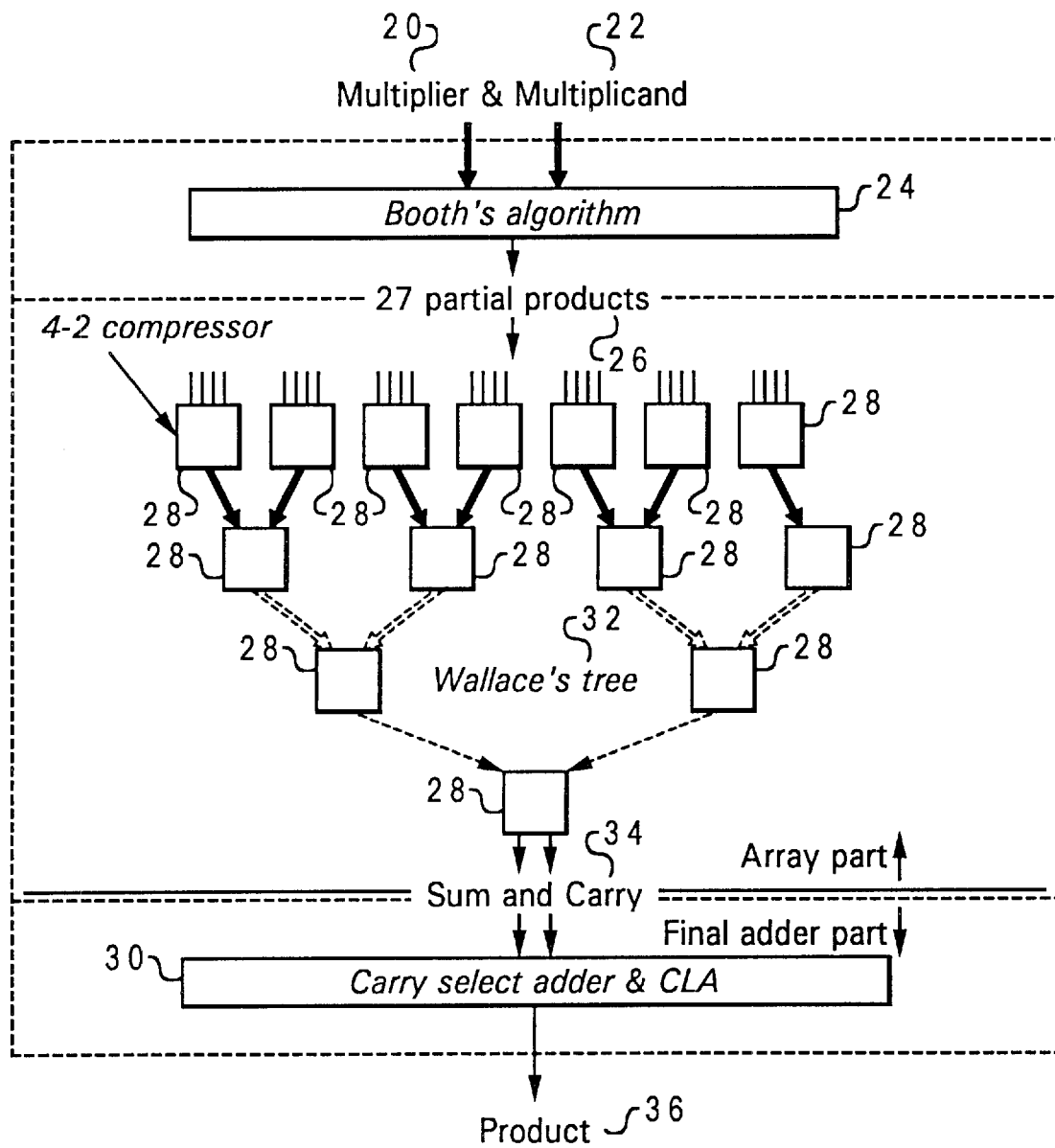
FIG. 1 is a prior art hard-wired multiplication scheme for implementing multiplication.
Figure 2:
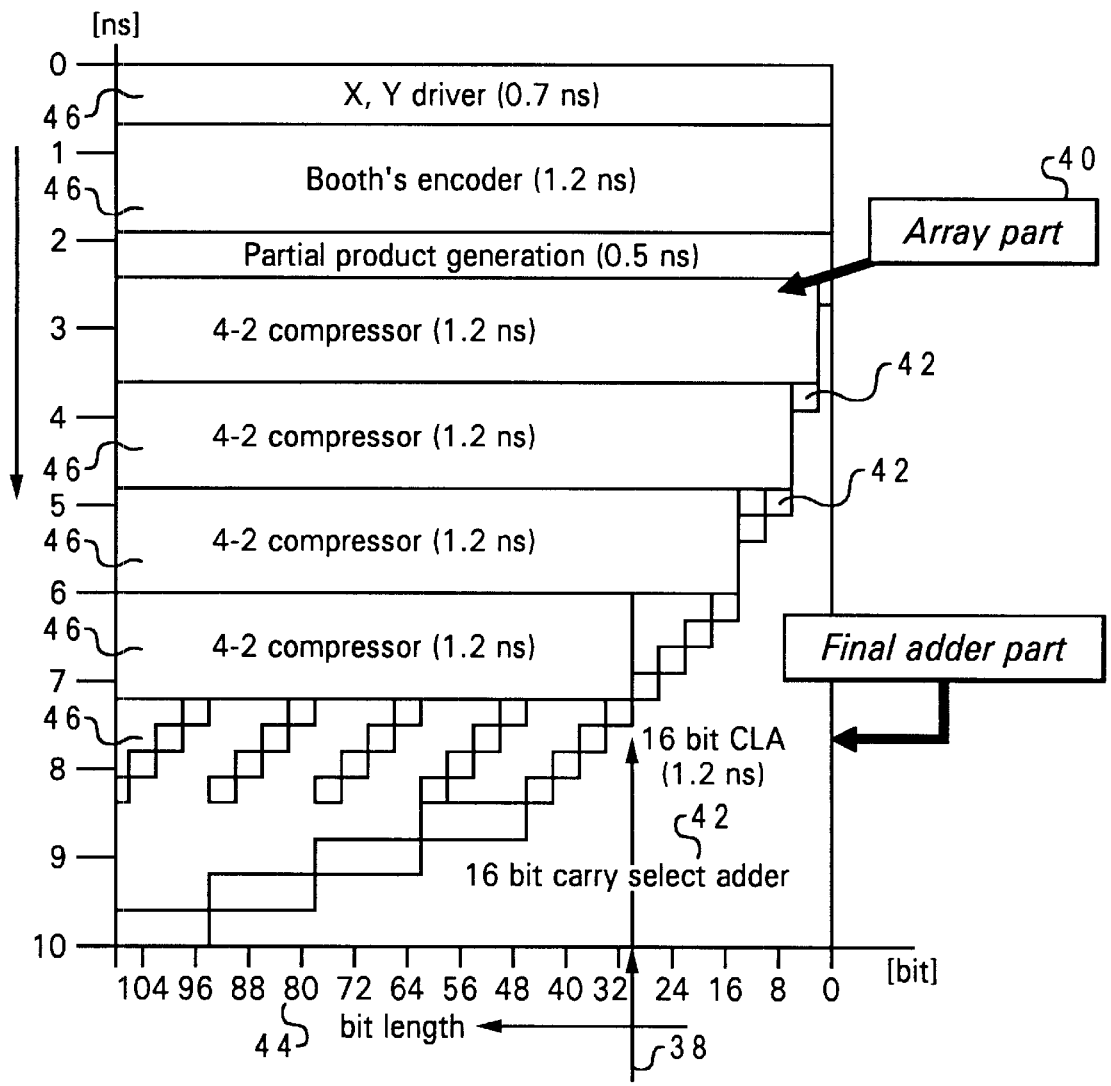
FIG. 2 is a timing diagram illustrating one prior art solution for a method for a speedup bit multiplier.
Figures 3C, 3D:
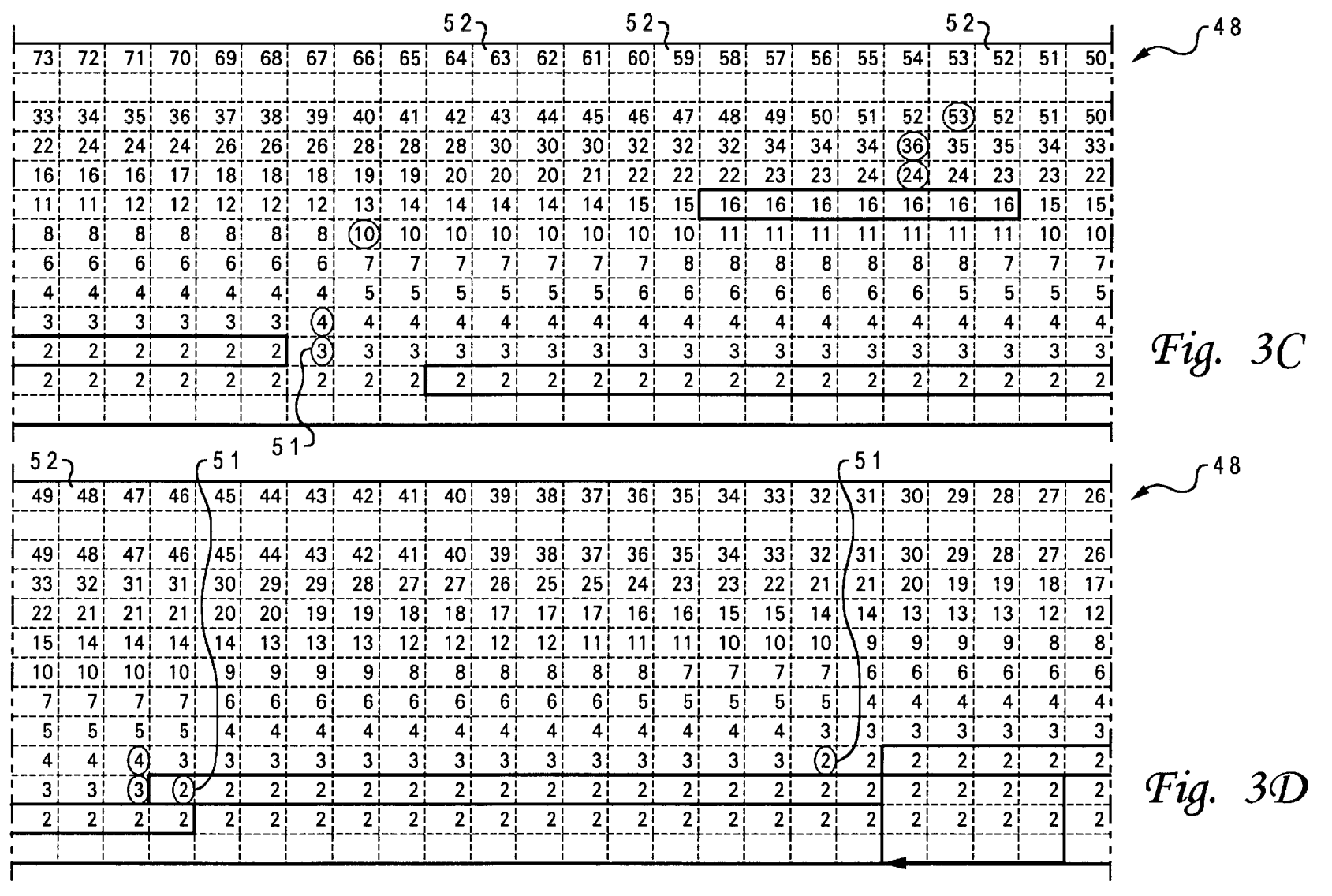
Figure 3E:
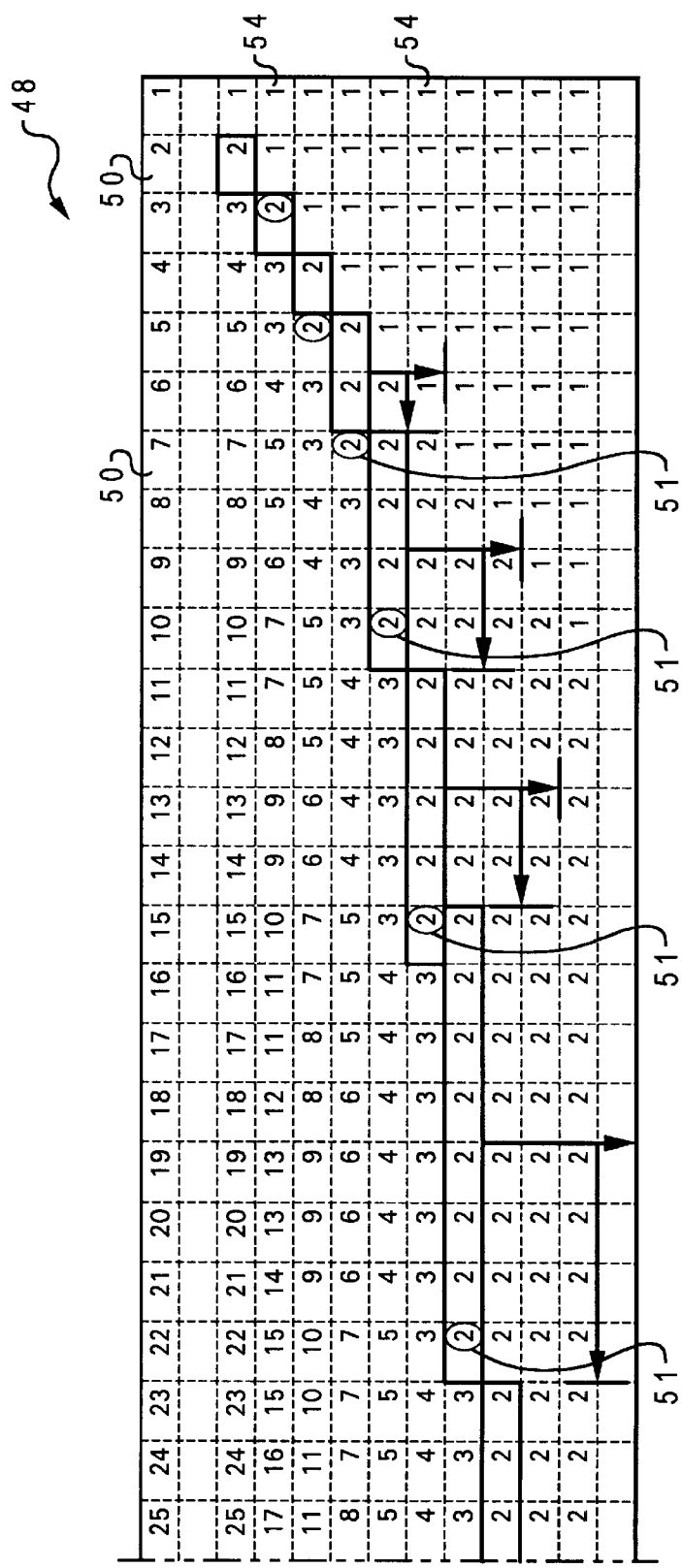
FIG. 3 depicts a spreadsheet showing a multiplication operation for a 53×53 bit multiplier in accordance with a preferred embodiment of the present invention.

The present invention may be executed in a variety of computer systems under a number of different operating systems or information handling systems. The method and system of the present invention overlaps the process of partial product reduction and the final adder in both higher and lower-order bits. Referring now to the drawings and in particular to FIG. 3, there is depicted a spreadsheet 48 showing a multiplication operation for a 53×53 bit multiplier without using Booth encoding. The numbers in each space means the resulted number of bits at each column after every stage 54 of a carry save adder (CSA) level. It shows that the columns 50 at both ends, due to fewer numbers of bits in the beginning, complete their partial product reduction earlier than those columns 52 in the middle. The "lower-order bits" are those bits that are in less significant positions, i.e., to the right, of those bits whose final carry and sum outputs are produced last by the partial product reduction tree. Likewise, the "higher-order bits" are those bits in positions that are more significant, i.e., to the left, of those bits whose sum and carry outputs finish last. The digit 2 in a space means the partial product reduction is completed waiting for the final addition. Therefore, only central columns 52 need to go through all stages 54 of CSA. The columns that have reached number 2 can begin the final addition before the other columns are completed.

However, compared to the overlapped addition taught in the prior art on the lower-order bits, the major problem of overlapping the addition on the higher-order bits is that the carry is unknown before the addition of the lower-order bits is completed. The method and system of the present invention presents a new and novel technique to calculate the upper bound of the carry, as will be more fully described below. Also, it should be noted, that in accordance with a preferred embodiment of the present invention, one carry-select adder should calculate the overlapped addition on the higher-order bits all together. If they are done separately as the lower-order bits do, each carry-select adder will need one stage delay to get its carry-out, thus increasing propagation delay. In accordance with the preferred embodiment, the calculation on the overlapped addition of the higher-order bits should be performed on the second to last row.

Figure 4:
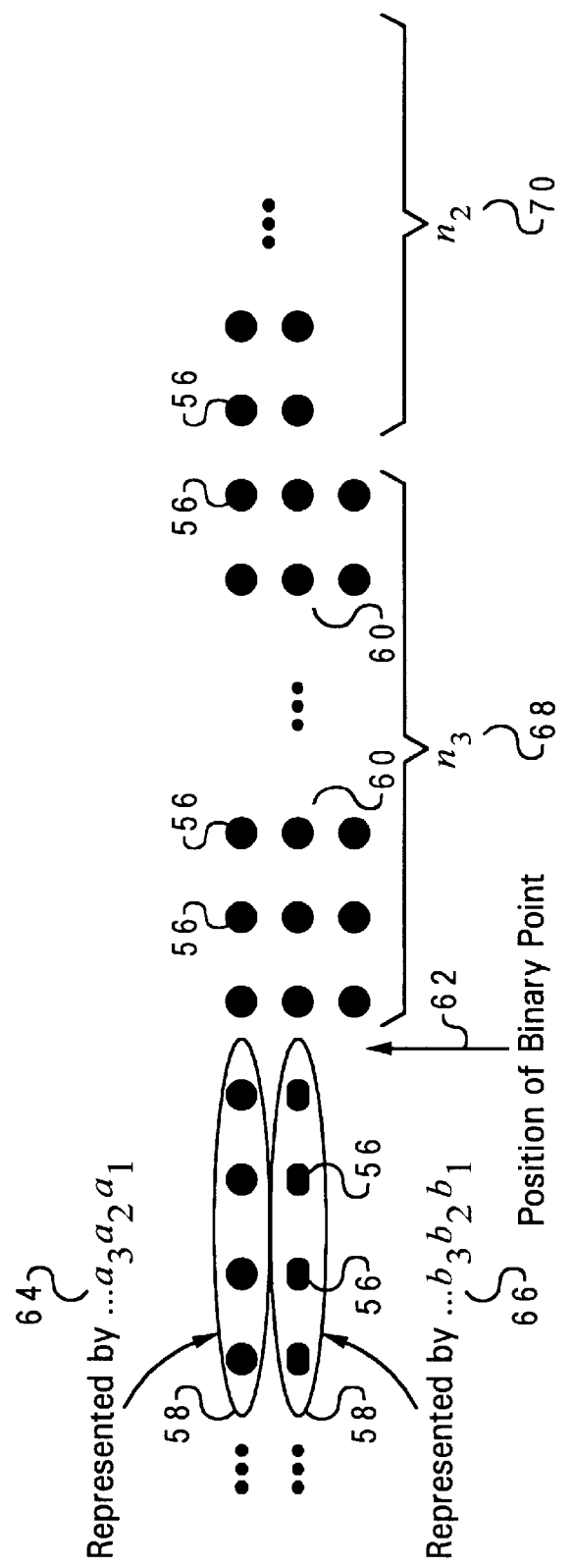
FIG. 4 illustrates the second to last stage of a CSA for the partial product terms (bits) in some higher-order-bit columns of FIG. 3.

Referring now to FIG. 4, the second to last stage of CSA for the partial product terms (bits) in some higher-order-bit columns of FIG. 3 are shown already reduced to 2. Using the dot matrix shown in FIG. 4, the upper bound of the carry may be derived. Each dot 56 represents a partial product bit. Assume that there is a binary point 62 located between the last column with two bits 58 and the first column with three bits 60. Designating $A=a_m \ldots a_3 a_2 a_1$ 64 and $B=b_n \ldots b_3 b_2 b_1$ 66 to represent these portion of bits, where m and n are the highest orders of A and B, respectively, and using $X=x_p \ldots x_3 x_2 x_1$ to represent their addition, gives the following result:

$$\begin{array}{r} \ldots a_3 a_2 a_1 \\ + \; \ldots b_3 b_2 b_1 \\ \hline \ldots x_3 x_2 x_1 \end{array}$$

With these designations, the upper bound of the carry at this level of CSA may be derived. Let n3 68 and n2 70 be the numbers of columns to the left of binary point 62 with 3 bits and 2 bits, respectively, after some levels of partial product reductions. Designating $C_{upper\_bound}$ to represent the upper bound of a carry that can possibly propagate from the bits to the right of the decimal point 62, then the $C_{upper\_bound}$ may be calculated by assuming all bits are one and then summing all the bits to the right of the decimal point together as shown in the mathematical equation of FIG. 5.

Referring once again to FIG. 5, the upper bound of the carry is shown to be smaller than 3. More specifically, the actual carry (Cactual) may be 3 different values, with 0, 1, or 2. A straight forward approach would be to implement a carry select adder for the bits to the right of the binary point with 3 CLAs, each with an assumed carry-in of 0, 1, or 2, respectively. However, the method and system of the present invention presents a new approach to implement the carry-select adder for the three possible carries while only needing 2 CLAs as in an ordinary carry-select adder.

The key to this improvement lies in separating the bits of the sum $X_n \ldots X_2 X_1$ into two parts, $X_n \ldots X_2$ and $X_1$. With this division, there are three potential sources of a carry into $X_2$: if the sum of bits to the right of the binary point produces a carry out of 2; if the sum of bits to the right of the binary point produces a carry of one and only one of $A_1$ or $B_1$ is a one; or if a carry out is generated at bit position 1 ($A_1=1$ and $B_1=1$). There is only one way for two of these sources of a carry into $X_2$ to occur at the same time, however. It is possible for the bits to the right of the binary point to produce a carry of 2 while $A_1=1$ and $B_1=1$ also. This possibility suggests that even for the sum $X_n \ldots X_2$, the carry into $X_2$ can be 0, 1, or 2. In the method and system of the present invention, the necessity of including the case of two simultaneous carries into $X_2$ in the selection logic of the carry-select adder is eliminated by incorporating the generated carry for $A_1=1$ and $B_1=1$ already in the first stage of the CLAs for $A_n \ldots A_2 + B_n \ldots B_2$. With this source of a carry into $X_2$ accounted for, only a carry of 2 from the bits to the right of the binary point, or propagation of a carry of 1 remain as sources of a carry into $X_2$. These two remaining possibilities are mutually exclusive and produce a carry into $X_2$ of at most 1. They are both covered by incorporating the sum $A_1+B_1$ as the most significant bit of the CLAs for the middle columns, so that the carry selection for $X_n \ldots X_2$ is determined by only a single carry of 0 or 1. The case of a carry-in of 2 into $X_2$ is not possible in the carry selection stage of the final addition, since one of two contributors to the carry in (both $A_1=1$ and $B_1=1$) has already been counted when the sums X were calculated.

With the logic shown in Table 1 of FIG. 6, the carry-select adder for A and B needs only two CLAs, each of which uses either 0 or 1 as a carry-in at bit position $X_2$, the least significant bit included in the CLAs. This eliminates the extra logic to implement 3 CLAs and a selection for a carry of 0, 1, or 2. Two modifications are required, however. The CLA for a carry-in to $X_2$ of 0 must include a term for a carry generated by $A_1+B_1$, and the sum $A_1+B_1$, and the sum $A_1+B_1$ is included in the CLA for the center group of bits. The carry generated from the final addition of the middle part of the bits, including the sum $A_1+B_1$ as the most significant bit of the group, after the carry select reppling through from the low-order bits, will be used as the correct carry-in to select the result out of the carry-select adder for the high-order bits. This sum may be generated using only an OR-gate. The carry generated from the final addition of the middle part of the bits, after the carry select rippling through from the lower-order bits, will be used as the correct carry-in to select the result out of the carry-select adder for the higher-order bits. Once the carry-in is known, only one more stage is needed to complete the addition. Since the carry-in is usually obtained one logic stage earlier than the sum, the adder for the middle columns and the adder for the higher-order bits can complete their final additions at the same time, assuming that the two possible results are ready in the carry-select adder.

A multiplier implementing multiplication and complying with IEEE-754 standard (as those used in the IBM PowerPC) has 52 bits in its fraction. If one hidden bit became explicit, there are a total of 53 bits in the fraction. The multiplier generates 53 rows of partial products when no Booth encoding is used, which will use one stage for partial product generation, 9 logic stages with a 3/2 CSA counter and 8 logic stages in the final adder. This brings the total number of the logic stages to 18. If a radix-4 Booth encoding algorithm is used, the partial product has 27 rows. Since a Booth encoder and its MUX need 2 logic stages, the CSA counter for 27 partial product rows needs 7 stages and an adder needs 8 stages, the total stage number is 17. Since fewer columns in the last stage of CSA are added than prior art solutions, its addition may need fewer stages. This approach (either using Booth encoding or not) may save 1 logic stage compared to the traditional Booth encoding approaches without using overlapped addition.

This saving of one logic stage may best be understood by turning once again to the spreadsheet shown in FIG. 3. Once again, the number in each space of the spreadsheet represents the resulted number of bits at each column after each stage 54 for a given CSA level. As noted earlier, the columns 50 at both ends has fewer number of bits in the beginning, and thus can be compressed to 2 earlier than those in the center 52. Once they are compressed to 2, the final addition in that portion can begin. For example, those number 2's marked by the circles 51 can begin the final addition at that CSA stage 54. Although the stage number of the CSA counter is the same as the traditional approach, the final adder can save some stages. The number of stages that the adder needs to complete is determined by how many bits are in each operand, as shown in Table 2 of FIG. 7. Referring to FIG. 7, the number of bits at the last CSA level in FIG. 3 is 22 bits wide. A 22-bit CSA needs 6 stages, which is 2 stages fewer than a 106-bit CSA needs.

When a carry-select adder is used, it usually extends one more stage than the number in Table 2 to select the final sum and carry. However, if the carry-in is ready before the calculation of carry-out and sum in the two carry-look-ahead adders is completed, no extra extended stage is needed if the last stage of the sum and carry-out is modified. Take the example of a 4-bit Carry-Select Adder (CLA). The last stage of carry-out in a typical CLA is to implement the function of $G^0_{03}=G^0_{23}+P^0_{23}G^0_{01}$ for carry-in=0 and $G^1_{03}=G^1_{23}+P^1_{23}G^1_{01}$ for carry-in=1 and will be selected when the actual carry-in is obtained. If the carry-in is ready before this stage is executed, these two functions can be combined with the carry-in and become:

$$C_{out}=G^1_{03}C_{in}+G^0_{03}\overline{C}_{in}=(G^1_{23}+P^1_{23}G^1_{01})C_{in}+(G^0_{23}+P^0_{23}G^0_{01})\overline{C}_{in}$$

Figure 8:
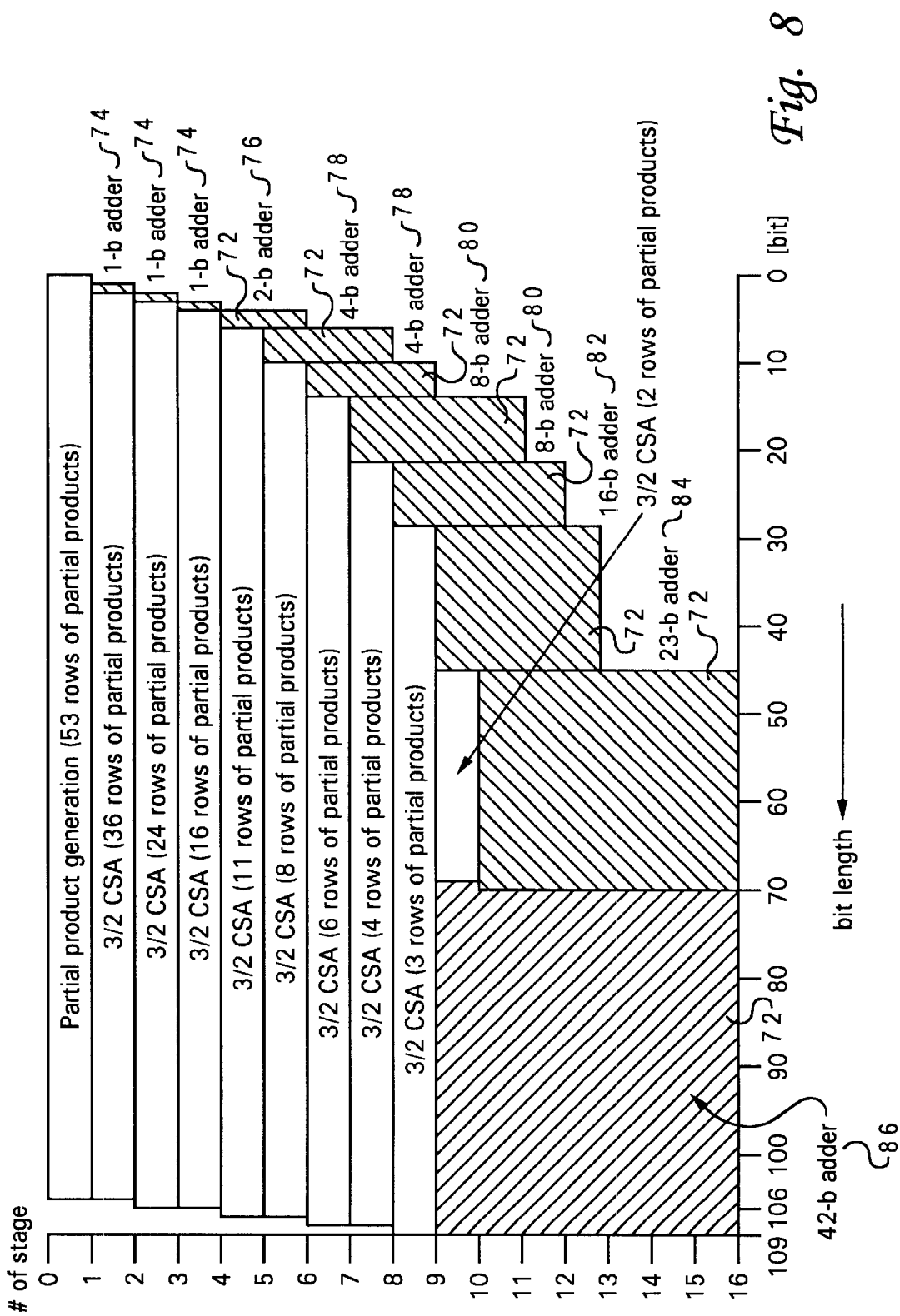
FIG. 8 is a high-level diagram showing an implementation for a 53×53 bit multiplier in accordance with the present invention.

Since it has 3 devices in a stack, it can be easily implemented in either static or dynamic circuits with only 20% more delay in the last stage. Similarly, the EX-OR gates that generate the sum bits can also merge with the carry-in to save on propagation delay. Referring now to the diagram shown in FIG. 8, there is depicted one implementation for this multiplier. The shaded areas 72 in FIG. 8 represent the time that each adder needs. The addition at both ends of the partial products is calculated concurrently, and thus does not increase the propagation delay. On the lower-order bits, each carry-select addition completes as long as the carry-in from the previous stage is ready. This approach may also be implemented with Booth encoding.

In accordance with a preferred embodiment of the invention, a few different adders are needed when performing 53×53 bit multiplication. Referring once again to FIG. 8, they are three 1-bit adders 74 (without carry-in) used at rows 1 to 3, one 2-bit carry-lookahead adder 76 (without carry) at row 4, 4-bit carry-select adders 78 at rows 5 and 6, two 8-bit carry-select adders 80 at rows 7 and 8, one 16-bit carry-select adder 82 at row 9, one 23-bit carry-select adder 84 at row 10 (final addition for the left-over bits) and one 42-bit carry-select adder 86 at row 9 (overlapped addition to the left of the decimal point). The last 42-bit and 23-bit carry-select adders, 86 and 84 respectively, have two bits overlap as described above.

Figure 9:
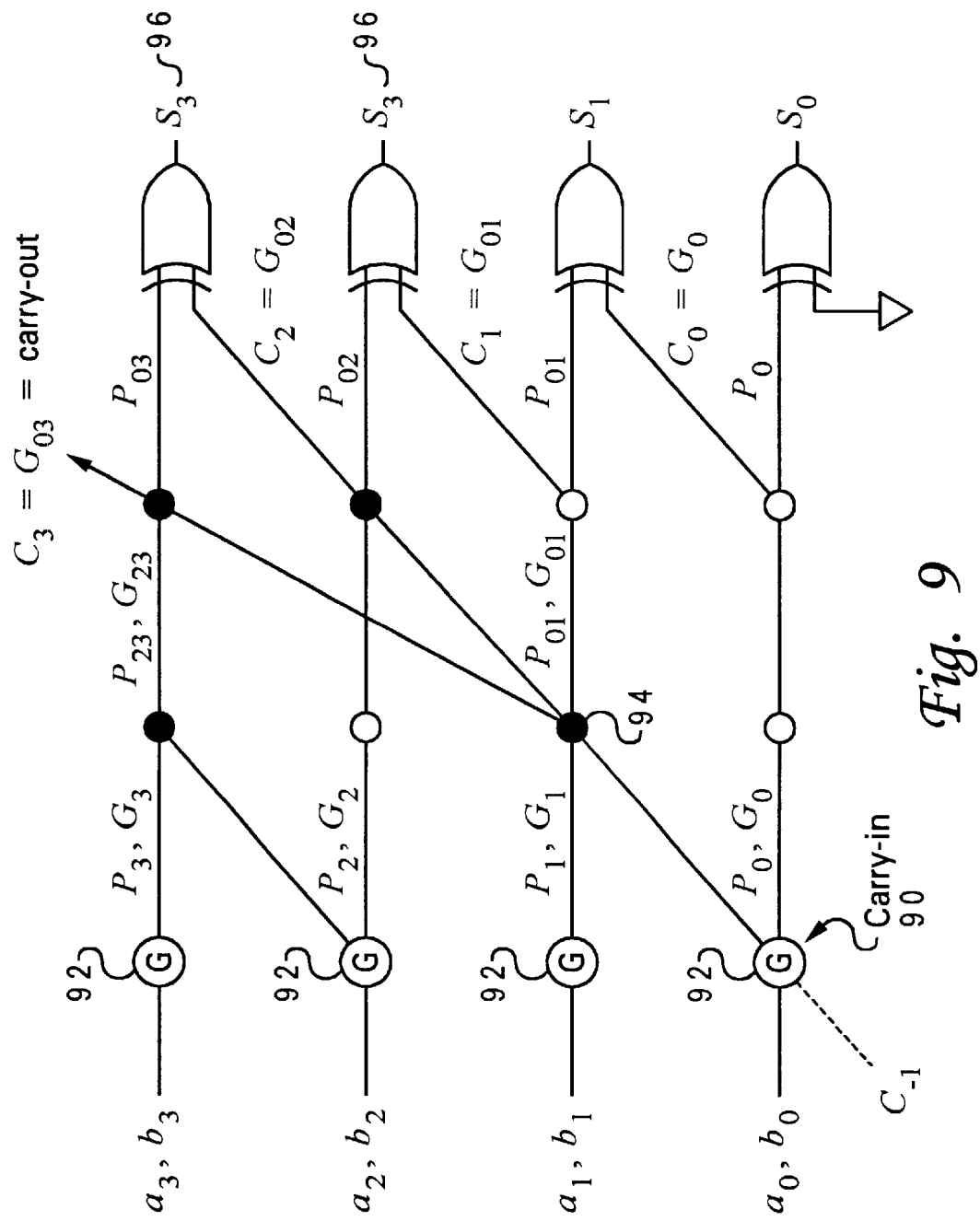
FIG. 9 is a logic diagram of a 4-bit CLA that may be used with the 53×53 bit multiplier of FIG. 8.

Since all the CLA's are very similar, a logic diagram for a 4-bit CLA is depicted in FIG. 9, which may be used in accordance with the present invention. As shown in FIG. 9, if there is no carry-in 90, the P,G generator 92 and the first stage of merger 94 can be combined and thus result in 3 logic stages of delay at sum 96 and 2 logic stages of delay at carry-out. Therefore, the P,G generation stage can combine with the first merging stage (black dots) to save one logic stage.

It is also important to note that although the present invention has been described in the context of fully providing a speedup multiplier implementing multiplication, those skilled in the art will appreciate that the mechanisms of the present invention are capable of being distributed as a program product in a variety of forms to any type of information handling system, and that the present invention applies equally regardless of the particular type of signal bearing media utilized to actually carry out the distribution. Examples of signal bearing media include, without limitation, recordable type media such as floppy disk or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for providing speedup of a bit multiplier, said method comprising the steps of:

performing a bit multiplication producing a partial product array; and reducing said partial product array by performing overlap addition on both higher-order bits and lower-order bits.

2. The method for providing speedup of a bit multiplier according to claim 1, wherein reducing said partial product array further includes the step of:

performing overlap addition on a final adder.

3. The method for providing speedup of a bit multiplier according to claim 1, wherein reducing said partial product array further includes the step of:

calculating said overlap addition on said higher-order bits utilizing one carry-select adder.

4. The method for providing speedup of a bit multiplier according to claim 1, wherein reducing said partial product array further includes the step of:

calculating said overlap addition on said higher-order bits utilizing a second to last row of said partial product array.

5. The method for providing speedup of a bit multiplier according to claim 1, wherein reducing said partial product array further includes the step of:

calculating said overlap addition on said higher-order bits utilizing two carry-look-ahead adders.

6. The method for providing speedup of a bit multiplier according to claim 1, wherein reducing said partial product array further includes the step of:

calculating said overlap addition on said lower-order bits utilizing Booth encoding.

7. The method for providing speedup of a bit multiplier according to claim 1, wherein reducing said partial product array further includes the step of:

merging results of EX-OR gates that generate sum bits with carry-ins in a carry-look-ahead adder.

8. An information handling system providing speedup of a bit multiplier, comprising:

means for performing a bit multiplication producing a partial product array; and means for reducing said partial product array by performing overlap addition on both higher-order bits and lower-order bits.

9. The information handling system according to claim 8, further comprising:

means for performing overlap addition on a final adder.

10. The information handling system according to claim 8, further comprising:

means for calculating said overlap addition on said higher-order bits utilizing one carry-select adder.

11. The information handling system according to claim 8, further comprising:

means for calculating said overlap addition on said higher-order bits utilizing a second to last row of said partial product array.

12. The information handling system according to claim 8, further comprising:

means for calculating said overlap addition on said higher-order bits utilizing two carry-look-ahead adders.

13. The information handling system according to claim 8, further comprising:

means for calculating said overlap addition on said lower-order bits utilizing Booth encoding.

14. The information handling system according to claim 8, further comprising:

merging results of EX-OR gates that generate sum bits with carry-ins in a carry-look-ahead adder.

15. A computer program product residing on a computer usable medium for providing speedup of a bit multiplier, comprising:

instruction means for performing a bit multiplication producing a partial product array; and instruction means for reducing said partial product array by performing overlap addition on both higher-order bits and lower-order bits.

16. The computer program product according to claim 15, further comprising:

instruction means for performing overlap addition on a final adder.

17. The computer program product according to claim 15, further comprising:

instruction means for calculating said overlap addition on said higher-order bits utilizing one carry-select adder.

18. The computer program product according to claim 15, further comprising:

instruction means for calculating said overlap addition on said higher-order bits utilizing a second to last row of said partial product array.

19. The computer program product according to claim 15, further comprising:

instruction means for calculating said overlap addition on said higher-order bits utilizing two carry-look-ahead adders.

20. The computer program product according to claim 15, further comprising:

instruction means for calculating said overlap addition on said lower-order bits utilizing Booth encoding.

* * * * *